United States Patent Office 3,677,819
Patented July 18, 1972

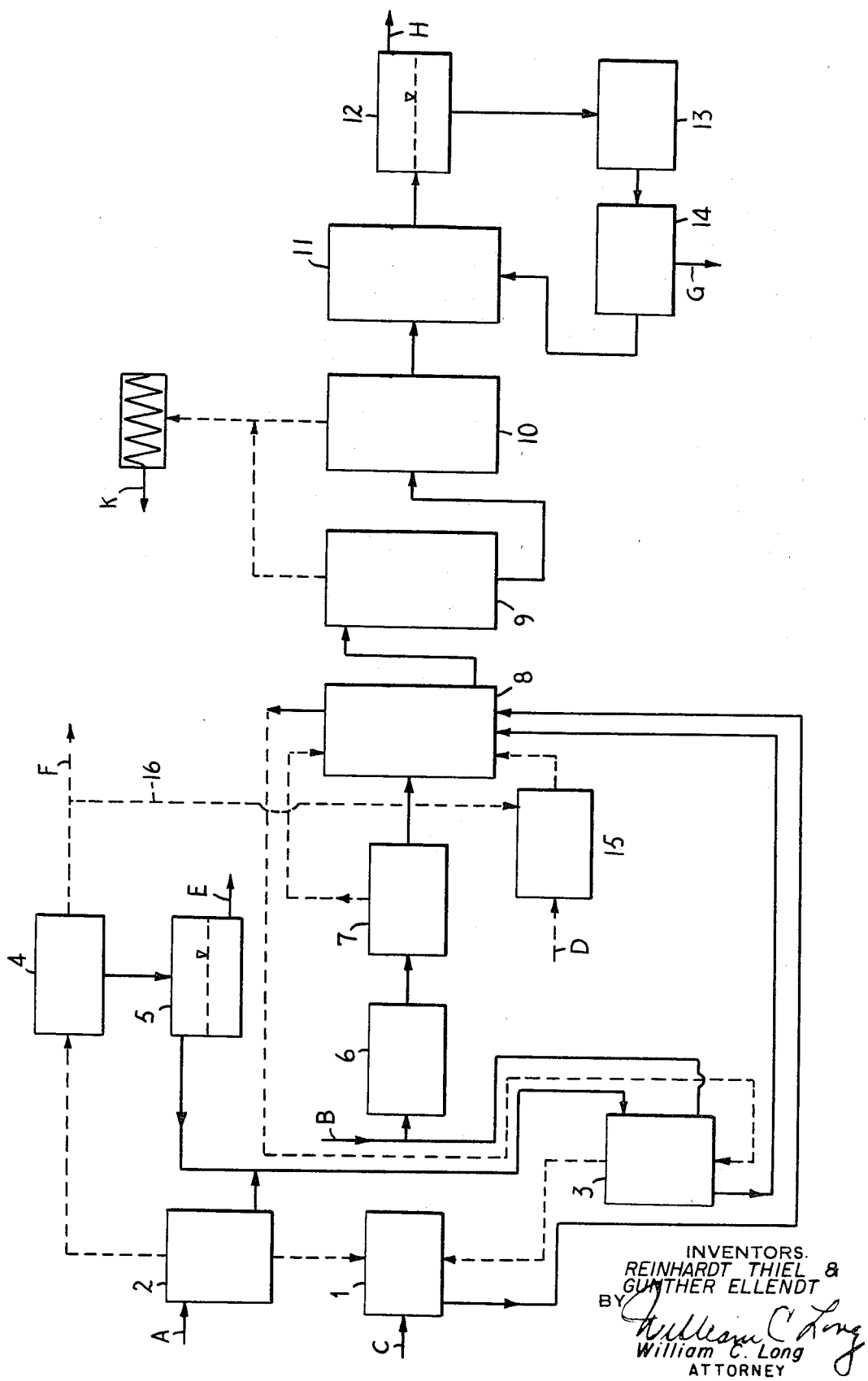

3,677,819
PROCESS FOR THE CLEANING OF PLANTS WHICH ARE USED FOR THE OXIDATION OF SATURATED HYDROCARBONS IN THE PRESENCE OF BORON COMPOUNDS
Reinhard Thiel and Gunther Ellendt, Krefeld-Bockum, Germany, assignors to Halcon International, Inc.
Filed Mar. 17, 1970, Ser. No. 20,379
Int. Cl. B08b 9/00
U.S. Cl. 134—2        3 Claims

ABSTRACT OF THE DISCLOSURE

Process for the cleaning of plants which are used for the oxidation of saturated hydrocarbons in the presence of boron compounds by rinsing, which is characterized by treating equipment and lines of the plant with alcohol-containing solutions at elevated temperature under exclusion of oxygen from the air and if necessary at elevated pressure and/or by passing inert gas through.

BACKGROUND OF THE INVENTION

The invention concerns a process for the economic cleaning of plants which are used for the oxidation of saturated hydrocarbons in the presence of boron compounds, by rinsing combined with reaction.

Processes for the continuous fluid phase oxidation of saturated hydrocarbons in the presence of boron compounds which are suitable for the formation of boric acid esters have achieved great technical significance.

These processes have the disadvantage in their technical application that crusts and deposits of boron compounds occur which are partly interspersed with tar-like byproducts of the reaction. This disadvantage is caused by the relatively large amount of boric acid which is required for the conversion. Therefore, such plants must be shut down at certain time intervals, emptied and painstakingly cleaned.

The customary procedure has been to fill parts of the plant or the whole plant with caustic solution and to move around this caustic solution at elevated temperature and elevated pressure. The efficiency of the plant is significantly decreased by these time-consuming measures, and significant boric acid losses have to be accepted.

Moreover, great difficulties occur in working with the caustic solution, since the alkaline solution has a strong tendency to foam and thereby parts of the plant are affected which by themselves could be excluded from the cleaning, conversely which are very sensitive to the introduction of alkali.

Therefore, attempts have been made repeatedly to prevent the formation of deposits in advance by suitable methods. One such method is described in German Pat. No. 1,281,443. According to the procedure of this patent it is possible to keep single parts of the plant free of solids depositions, in this case the vaporizer in which entrained boron compounds can occur in very small concentrations. This method is not applicable, respectively not effective, in equipment and lines which serve the chemical conversion, respectively transport of boron compounds, and where these materials are present in concentrations of a different order of magnitude (these are for instance units for the dehydration of ortho boric acid, for the oxidation of hydrocarbons in the presence of boric acids and all pressure vessels following the reaction stage.

SUMMARY OF THE INVENTION

The invention concerns a process for the cleaning of plants which serve for the oxidation of saturated hydrocarbons in the presence of boron compounds, according to which it is possible to eliminate easily and quickly boron-containing and resinous deposits and which is characterized by treating equipment and lines of the plant with alcohol-containing solutions at elevated temperature under exclusion of oxygen from the air and if necessary under elevated pressure and/or by passage of inert gas. For the purposes of the invention those alcohols are to be considered for use in the alcohol-containing solutions which can form soluble boric acid esters. This can involve mono- or di-alcohols or mixtures of these, e.g., ethanol, propanols, butanols, pentanols, hexanols, octanols, cyclohexanol, methyl cyclohexanols, cyclooctanol, cyclododecanol, ethylene glycol or cyclohexanediols. The amount of alcohol which has to be used depends on the quantity of the deposits and should be at least equivalent to the amount of boric acid precipitated. The alcohol respectively, the alcohol mixture may be applied without dilution, however preferred is a non-aqueous solution, for instance in hydrocarbons, ketones or esters. Since during the action of the alcohols on the boric acid-containing deposits water is split off, which preferably should be removed from the reaction equilibrium, it is useful to apply the alcohols as a solution in compounds which are immiscible or only slightly miscible with water in order to be able to easily separate the water after distillation and to recycle the organic phase.

It is advantageous to use that alcohol for the cleaning, which is produced during oxidation in the equipment to be cleaned.

In a particularly advantageous manner, the process according to this invention is applied such that the organic phase which is obtained after the partial liquid phase oxidation of the hydrocarbons and following hydrolysis of the boric acid esters so produced, and which consists predominantly of unconverted hydrocarbon and the corresponding alcohol (aside from small amounts of the corresponding ketone and other substances), is used directly for the cleaning, if desired under addition of further quantities of the same alcohol.

The cleaning of the plant is carried out at elevated temperature, about 100 to 200° C., and elevated presusre which should be about 1 to 6 atmosphere gauge above the particular vapor pressure of the alcohol solution used. In order to obtain a solution of the deposits as fast and efficiently as possible, it is advantageous to accelerate the mass transfer by intensive circulation of the fluid (e.g. mixing or pumping round). Similar results are achieved by passing inert gases as carriers for the water formed, where it may be an economic advantage to recirculate the gas by means of a compressor after condensing out the vapors.

The application of the process can occur in such a manner that the equipment and lines which have to be cleaned are filled with the alcohol-containing solution and this is left to act under the above mentioned conditions for such a time, until all solids have been dissolved away, which for instance can be recognized by the termination of the formation of water. The boron compounds contained in the solution can subsequently be recovered by hydrolysis and treated in the facilities for the regeneration of boric acid which are connected with the plant. It is particularly expedient to circulate the solution to be used continuously through the plant and to feed it back into the cycle after separation of the converted boric acid in the following hydrolysis facilities, while using the existing installations. In this manner, a very rapid and simple changeover between oxidating and cleaning processes is possible by shutting off air for oxidation and feeding back oxidation products into the plant instead of pure hydrocarbons.

The procedure is applicable in all equipment in which hydrocarbons are oxidized in the presence of boron compounds. It has proven to be particularly valuable in such facilities in which hydrocarbons with four to eight carbon atoms are oxidized and here again particularly in facilities for the cyclohexane oxidation, which operate continuously.

The process according to this invention allows a rapid solution also of thick crusts respectively sediments. It should be considered extraordinarily surprising that with the process according to this invention not only boric acid deposits but also resinous precipitates, which sometimes occur in significant quantities, can be removed.

The process according to the invention represents a considerable technical advance compared with practice for the cleaning with caustic as used till now, since cleaning occurs in significantly shortened time periods and preferably by application of such cleaning materials which are not "foreign" to the plant. Moreover, the process shows the advantage that significant quantities of boric acid are recovered for the process.

The following examples in connection with the attached schematic illustration clarify the process according to this invention. Whenever parts and percentages are mentioned, they refer to weight.

EXAMPLE I

In the attached schematic drawing a plant is shown which is suitable for the continuous oxidation of aliphatic or alicyclic hydrocarbons, especially cyclohexane, in the presence of boric acids. In this drawing the full lines indicate flows of liquids or suspensions, the dashed lines flows of gases or vapors. The cyclohexane A to be partly oxidized is preheated in heat exchangers 2 and 3 by the vapors from reactors 8 and most of it will be fed to the first of several reactors 8 which are arranged in cascade. A side stream is fed via a preheater 6 into a vaporizer 7 after mixing with additional cyclohexane B. Here the greatest portion is vaporized and blown into the reactors as a heating medium in the required quantity; excess cyclohexane can be fed as a liquid from the vaporizer into the reactors. The ortho boric acid which is required for the oxidation is slurried in cyclohexane C, fed into the dehydration vessel 1 and there dehydrated to meta boric acid by means of the reactor off gases which have been somewhat cooled down in heat exchanger 3. From the dehydration apparatus 1 meta boric acid suspension is fed into reactors 8. Air for oxidation (D) is introduced into the reactors by compressor 15; the reactor off gases which consist mainly of nitrogen and cyclohexane vapors flow through heat exchanger 3, the dehydration vessel, heat exchanger 2, and end up in condenser 4. The cyclohexane which condenses here is freed in separator 5 from co-condensed water of reaction E and returned to heat exchanger 3. Off gas is eliminated via F. Cyclohexane is converted at temperatures of 160–180° and elevated pressure with measured quantities of air to about 6–12% in the reactors 8 which are equipped with agitators. The reaction product is mainly boric acid-cyclohexyl ester. The product coming out of the reactors passes through an intermediate container 9 which is provided with baffles to guide the flow, and ends up in a flash column 10 in which part of the unconverted cyclohexane is distilled off (K). The bottoms product of the flash column is fed into an hydrolysis apparatus 11 in which the boric acid esters produced previously are saponified at elevated temperature by mixing with the boric acid mother liquor which has been separated in centrifuge 14, if desired by addition of fresh water. The following separator 13 is used for phase separation. While the organic phase is passed on for further treatment (H), the aqueous boric acid solution goes to a crystallization apparatus 13, for instance a vacuum crystallizer from which the recovered ortho boric acid can be removed via a centrifuge 14 (G).

The plant as described, the effective operating contents of which correspond to about 400 tons of cyclohexane at reaction conditions without taking into account the hydralyzer 11 and separator 13, is affected by increasing encrustation during operation because of deposition of boron compounds in the equipment and lines. Centers for the crust formation are the dehydration apparatus 1, reactors 8, intermediate condenser 9, the bottoms of the flash column 10 and the lines for liquids, respectively suspensions, which connect those items of equipment. Moreover, resinous deposits occur preferably in reactors 8 and the reactor off-gas lines to heat exchanger 3. In order to prevent serious disturbances of the operation the plant is cleaned at certain time intervals according to this invention in the following manner:

In a plant which is being operated continuously first of all the air feed to the reactors is stopped and instead the off gases from condenser 4 are fed back into the reactors and brought into circulation via line 16 by means of compressor 15 or an additional compressor. Gas losses which occur are made up by feeding nitrogen. The gas quantity to each of the four reactors is controlled at 1800 Nm.$^3$/hr. Subsequently, the boric acid feed to dehydration is stopped.

(If one is prepared to forego the quantitative recovery, described below, of the boric acid which has been dissolved during the cleaning process, then also the cyclohexane feeds A, B and C are stopped and instead the organic phase from separator 12 is returned to the plant.)

In order to be able to determine the amount of boric acid which has been deposited and dissolved during the cleaning process, subsequently such dissolved respectively suspended boric acid which is still present in the plant is rinsed out with cyclohexane. For this purpose the following quantities of cyclohexane are fed via the three feed lines described above:

A=24 tons/hr.
B=42 tons/hr.
C=26 tons/hr.

Heating of the reactors by feeding cyclohexane vapors from vaporizer 7 is continued and the temperature in all four reactors controlled at 165°. The pressure in the vapor space of the reactors is controlled at 9.5 atmosphere gauge. Because of the pressure loss in the downstream equipment and lines, the off-gas leaves condenser 4 at a pressure of 7.7 atmosphere gauge before it is fed again to compressor 15. The boric acid which has been washed out of the plant is dissolved in water in the hydrolysis apparatus and removed via centrifuge 14 after the crystallization.

All suspended, respectively dissolved, boric acid is removed from the plant after an eighteen-hour period of the rinsing procedures with cyclohexane as described; the bottoms product which leaves flash column 10 is practically free of boric acid. The boric acid-containing and resinous deposits in the plant are, however, still present in the original form.

The cyclohexane which is fed out of the separator 12 is now returned via the recycle loop to the cyclohexane feeds A, B and C and the distillate which comes from the head of the flash column is returned as reflux. To the organic product which flows through separator 12 is continuously added such a quantity of a mixture produced in the cyclohexane oxidation, consisting of 92 parts cyclohexanol and 8 parts cyclohexanone, that the cyclohexanol concentration in the solution is maintained at a value of 10–11%. The addition of the cyclohexanol/cyclohexanone mixture is continued so long until the cyclohexanol concentration of the total product circulating in the plant amounts to about 10.5%. For this are required a total of 55 tons of mixture.

By feeding back the cyclohexanol-containing solution from separator 12 to the plant, the rapidly increasing formation of water starts, which collects in separator 5, and which is connected with the dissolution of the boric acid deposits. The chemical conversion between the alcohol and the deposited solids is significantly accelerated by the action of agitators installed in the dehydration apparatus, the reactors and in the reboiler part of the flash column as well as by the gas flowing through the plant. In order to shorten the length of the cleaning process further, the feed quantities to the plant are increased to the following values:

A=34 tons/hr.
B=45 tons/hr.
C=36 tons/hr.

About 20 hours after the start of the cleaning process, the elimination of water of reaction has slowed down significantly. In order to improve the mass transfer also in those parts of the plant in which the alcohol-containing solution is not agitated as well, now 50 Nm.$^3$/hr. of nitrogen is blown into the bottom of the intermediate storage tanks and 20 Nm.$^3$/hr. into the bottom part of the heat exchanger 2 which is full of liquid. Furthermore, the liquid flow from the reactor cascade to the intermediate storage vessels is throttled, in order to also clean the off-gaas line to heat exchanger 3 of resinous deposits with the foaming solution entrained by the gas out of the reactors.

While the dissolved boric acids dissolved during the cleaning process are recovered in the crystallizer, the resinous deposits are dissolved only partially and are deposited partly as a finely-grained powder on the bottom of the separator or may be removed by filtration of the feed to the crystallizer. After a total of 32 hours all deposits in the plant have been removed. 23.78 tons of boric acid were dissolved out and recovered. The circulation of the alcoholic solution is interrupted and pure cyclohexane and boric acid are fed again into the plant. Subsequently, the oxidation process is started up again by the introduction of oxygen in air.

EXAMPLE II

The plant described in Example I is cleaned in the above-mentioned manner, in which instead of a 10.5% cyclohexanol mixture a solution is used consisting of 90 parts cyclohexane and 10 parts of a technical alcohol mixture which contains 66% n-pentanol, 11% n-butanol, 10% cyclopentanol, 8% cyclohexanone and 4% cyclohexylformate. During a 36 hour period of the cleaning process 20.06 tons of boric acid were recovered and the deposits in the plant were removed.

EXAMPLE III

In certain cases it can be an economic advantage to clean only separate, especially badly encrusted parts of the plant according to the process of this invention, which is possible in an economic manner:

At a somewhat decreased rate of production in the reactors the intermediate storage 9 is bypassed (by means of a line which is not shown in the attached diagram); i.e., the product leaving the last reactor is fed directly into the flash column. Following this the product which is in the intermediate storage is displaced by a hot cyclohexane. Then a hot solution at 160° consisting of 9.2 parts cyclohexanol and 0.8 part cyclohexanone in 90 parts cyclohexane is fed continuously to the upper part of the intermediate storage, in a total amount of 13.5 tons/hr., during which the liquid level in the apparatus is maintained as high as possible and the product to be withdrawn from the bottoms of the intermediate storage is led to hydrolysis via the flash column. Simultaneously, nitrogen at a rate of about 50 Nm.$^3$/hr. is introduced to the bottom. The pressure in the intermediate storage is maintained at 7.5 atmosphere gauge and the excess nitrogen, together, with the water vapor which is formed during the solution of the boric acid deposits, is vented through a line from the top section into the flash column.

In the part of the plant which has a volume of 80 m.$^3$ all deposits, which correspond to a quantity of boric acid of 3.9 tons, have been dissolved after 30 hours.

What is claimed is:

1. In a process wherein a hydrocarbon is oxidized in the liquid phase with molecular oxygen in the presence of a boron compound to form a borate ester containing reaction mixture and wherein solid deposits containing boron materials and resinous materials form on apparatus surfaces which are in contact with liquid process streams, the improvement which comprises contacting said solid deposits at elevated temperature in the absence of molecular oxygen with an alcohol which forms soluble boric acid esters for a time sufficient to remove said solid deposits from said surfaces.

2. The process of claim 1 wherein said alcohol is formed by hydrolysis of said borate ester.

3. The process of claim 1 wherein said hydrocarbon is cyclohexane and said alcohol is cyclohexanol.

References Cited

UNITED STATES PATENTS

| | | | |
|---|---|---|---|
| 1,328,726 | 2/1918 | Dezendorf. | |
| 1,538,904 | 5/1925 | Osterhout | 134—22 XR |
| 2,004,042 | 6/1935 | Eberhardt | 134—22 XR |
| 3,027,280 | 3/1962 | King et al. | 134—22 |
| 3,037,887 | 6/1962 | Brenner et al. | 134—22 |
| 2,557,281 | 6/1951 | Hamblet et al. | |
| 2,653,147 | 9/1953 | Ackerman. | |
| 2,736,755 | 2/1956 | Reuter et al. | 260—666 |

MORRIS O. WOLK, Primary Examiner

J. T. ZATARGA, Assistant Examiner

U.S. Cl. X.R.

134—22